INVENTOR.
ARMIN ELMENDORF
BY
Townsend and Townsend
ATTORNEYS

United States Patent Office 3,378,617
Patented Apr. 16, 1968

3,378,617
METHOD OF FACING BUILDING PRODUCTS
WITH EXPOSED MINERAL GRANULES
Armin Elmendorf, 860 Charleston Road,
Portola Valley, Calif. 94025
Filed Feb. 24, 1965, Ser. No. 434,913
2 Claims. (Cl. 264—162)

ABSTRACT OF THE DISCLOSURE

A method of facing building products with exposed mineral granules is disclosed wherein a layer of inert particles is spread upon a supporting surface to a depth at least substantially no greater than will reach the medium plane of the resultant embedded mineral granules, disposing mineral granules larger than the inert particles in the layer until the mineral granules contact the supporting surface, spreading an inorganic binder on the layer of granules and then removing the inert particles from the space between the granules when the binder has set. The disclosure also includes provision for depositing inert particles in excess of that required for a single layer and removing excess granules not held by the inert particles as well as provision for different backing structures to the binder.

---

The methods of introducing mineral granules such as natural gravel into the surface of concrete walks and on wall surfaces on the job are well known to the building industry where the resultant construction is generally referred to as exposed aggregate. Two methods are commonly used, one primarily adapted for walls and floors being that in which the aggregate is pressed into a bed of fresh mortar after which the mortar is allowed to take an initial set. When this has taken place the surface is scoured with a brush or broom and water thereby removing much of the mortar between the pebbles thereby exposing many of the pebbles. The naturally rounded surfaces of the gravel provide an attractive and durable flooring for heavy foot traffic. This method, while practical for on-the-job use, has several deficiencies which make it unsuitable for use in a factory devoted to the manufacture of portland cement floor tile.

Floor tiles of the terrazzo type require a bed of sand or mortar on the job into which the blocks can be set. These, therefore, involve two operations, namely, the manufacture of the tile or blocks and subsequently the installation of the same.

Whether pebbles are introduced into the mortar on the job or in the factory, the necessary scouring is uneven and many of the stones are not exposed at all or only partially exposed. Many stones are completely removed and lost. The resultant surface is often uneven and not satisfactory for foot traffic. Producing exposed aggregate flooring blocks in a factory for subsequent installation in a job on a sand or mortar bed has therefore not been found practical.

In the other method in common practice for producing a wall treatment on the job, a cement mortar is trowelled on the wall and while the mortar is soft pebbles are embedded in the mortar. The excess falls off. Many pebbles are only lightly held and those that are seated in the mortar are held in a rounded pit in which the rim of the pit is curved and the pebbles are poorly anchored.

One of the purposes of the present invention is to eliminate the loss of pebbles resulting from current practice in on-the-job applications. Another purpose is to improve the anchorage of the pebbles when naturally rounded pebbles are used. A third purpose is to expose substantially all pebbles.

The present invention is aimed primarily at producing blocks and wall panels where the exposed mineral granules are on vertical surfaces. Such blocks or wall panels may be made of an aggregate consisting of inorganic elements such as pumice or cinders or of an organic fibrous particle such as wood shavings, straw, coconut shell fibers or sisal bonded together with an inorganic binder such as portland cement.

Another object of this invention is to facilitate the use of fractured granules of stone such as marble chips. The rounded natural pebbles and the crushed stone chips are herein referred to as mineral granules. Such granules may be of the size commonly used in terrazzo floors. The use of marble chips or granules on vertical wall surfaces has heretofore not been satisfactory. As in the use of rounded pebbles, the mortar must have a certain consistency to remain in a vertical position after trowelling. This consistency does not result in the best bonding. Better bonding is obtained with a thinner consistency. As in the case of rounded pebbles, pressing crushed chips into a vertical mortar surface results in craters with rounded edges and inadequate bonding or anchorage around the rim of the crater.

In the present invention mineral granules are deposited on a slurry on a horizontal surface. In place of embedding the same directly into a mortar they are first embedded in a slurry composed of inert particles. Flat facets of chips pressed into the slurry tend to assume a position parallel to the surface, and these facets are eventually exposed to view. The craters that result from pressing chips into a soft mass, and the rounded edges of the craters are in this mass, not in the mortar with which the chips are held in place permanently. The inorganic binder used for bonding the granules may have any desired consistency, hence a consistency may be used that results in the best filling of the spaces between the granules. The excess moisture is generally blotted up by sifting dry cement on the slurry. The stiff consistency necessary for trowelling mortar on vertical surfaces need not be used. The invention, therefore, has for one of its purposes the successful use of stone chips.

Another major purpose is the elimination of job building labor and the replacement of the same with factory labor. As in many other production processes, mechanization and the resultant reduction of labor greatly reduces cost. Mechanization also improves the appearance and the weather resistance of the relief-textured surface of the present invention.

While marble chips and other mineral granules can be bonded to wall surfaces with some synthetic resins that are durable in the weather such as epoxy resins, such resin binders when used in the amounts necessary for good bonding are expensive. They are, however, sometimes used on wall boards such as plywood panels intended for weather exposure. Some synthetic resins may also be used for bonding mineral granules to the surface of boards of the embedded fiber board type composed of wood strands bonded with portland cement under high pressure. When synthetic resins are used for bonding mineral granules to board products two steps are involved, the boards must first be produced, and the bonding of the mineral granules follows as a separate operation. One of the purposes of the present invention is to make possible the simultaneous bonding of the wood strands to each other and to the mineral granules in one operation.

Firm and permanent bonding of the mineral granules to the base panel is imperative. In the present invention bonding is achieved with time-tested materials, and the bonds are time-tested. Inorganic binders such as portland cement, magnesite cement, and gypsum are suitable binders.

My method of obtaining a textured surface is entirely different from that in which granules are deposited on a binder. When synthetic resin binders are used the procedure is similar to embedding pebbles in a mortar on the job in that the pebbles are deposited on the binder, whereas in the present invention the procedure is reversed, the binder being deposited on the pebbles.

In order to obtain maximum strength of boards or slabs with a given amount of wood and cement, the wood must be used in the form of shavings or strands in which the botanic fibers are parallel to the surface of the shavings, and bonding with portland cement takes place under high pressure maintained until the cement has set. If mineral granules embedded in cement are used on the surface of such a mat, the pressure must be released when the cement has achieved initial set in order to be able to remove some of the binder between the stones by brushing and washing. The compacted mass of cement and shavings then expands and remains expanded. The strength of the resultant mineral-surfaced board product is thereby materially reduced. The conventional method of producing raised aggregate surfaces by washing away some of the cement between the stones can therefore not be used in making high density strong boards for building exteriors. It is not possible to brush and wash away the cement between the stones after the cement has set permanently and the wood shavings are permanently bonded together.

It should be noted at this point that the product of this invention differs from the conventional terrazzo tile of the building industry. The latter is made by surfacing a block consisting of an aggregate and cement with marble chips completely encased in cement and then grinding the surface. A terrazzo surface is not textured, the surface being smooth even before grinding and all marbles chips are completely encased in cement. Both the marble chips and the embedding cement are ground. Grinding is slow, expensive, and wasteful because a substantial thickness of the marble-cement surface is ground away and discarded. The resultant ground surface is not textured. For wall and roof surfaces on the exterior of buildings textured surfaces are desired.

These and other features and advantages of the present invention will become more apparent upon a review of the following description with reference to the accompanying drawing wherein similar characters of reference refer to similar elements in each of the several views.

In the drawing, FIGURES 1 through 7 are side elevational views schematically illustrating the steps performed in accordance with the present invention.

Referring now to the drawing FIGURE 1 shows a supporting surface or caul 1 on rollers; 2 is a mass or batch of inert inorganic particles such as clay, moistened marble dust, or ground limestone; 3 is any well known spreading means such as a ribbed roller, or a notched blade; and 4 is a layer or slurry of inorganic inert particles or a paste supported on a caul. The granules settle in the slurry 4 until they may contact the caul 1. A slurry may also be obtained if the particles are first deposited as a dry powder and the moisture is added in the form of a spray.

Figure 1:
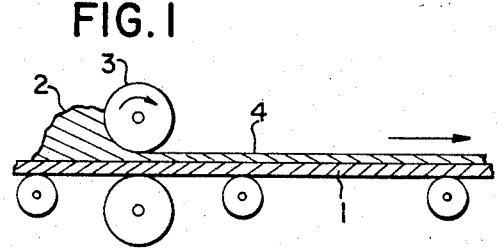
Figure 2:
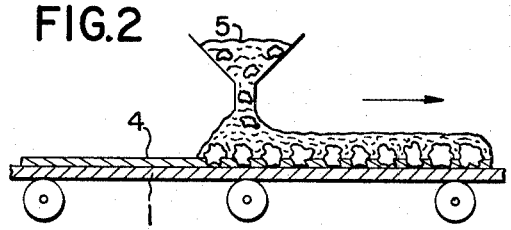
FIGURE 2 shows mineral granules 5 being spread on the layer of inert particles 4. This may be done by any well-known mechanism such as a butterfly valve, syntron or corrugated roll.

Various types of inorganic binders are used in the manufacture of building blocks composed of pumice, cinders, and wood shavings. Of the three types of binders most commonly used, namely, portland cement, magnesite cement and gypsum, portland cement is preferred because it is the most weather-resistant. The products of this invention are intended for use on the exterior of buildings, in the form of building blocks or in the form of building boards or slabs if the particles are wood shavings.

By inert particles is meant fine particles that do not bond together, or if held together, as by means of a soluble adhesive, can be readily separated by water. Inert particles differ from the particles of inorganic binders in that the latter are converted into a type of crystalline structure when the cement sets. They cannot be returned to their original state by means of water. The slurry or paste of inert particles used in this invention holds the mineral granules in position in even distribution and in a single layer while the cement binder is added. When the cement sets it retains on its surface between the mineral granules a thin layer of the inert particles. In the operation of scouring the surface of the block or board after the cement has set, the inert particles are completely removed except for this thin layer. The inert particles occupy part of the space between the mineral granules and when removed in the last step of the process of this invention, the granules are exposed with valleys and pits between them. This is then the textured surface desired. It is obtained with mineral granules such as marble chips firmly bonded to a matrix of coarse granules bonded together with an inorganic binder.

While the inert particles used in the process of this invention are dust-like before water is added, the mineral granules used are small fractured blocks of stone, or small stone pebbles. The mineral granules are much larger than the inert particles and they can be pressed into a slurry or putty-like layer of the particles. When the granules settle into the slurry or are pressed into the paste, the inert particle mass should preferably not extend beyond the middle of the granule. If slightly below the middle, superior anchorage of the granule in the cement is obtained with practically full exposure of the granule. Such anchorage cannot be obtained if the granules are pressed into a mortar. In the customary procedure of pressing the granules or pebbles in a mortar, craters with the rounded edges are produced in the binding cement, whereas in the present invention the craters are produced in the layer of inert particles and the cement 7 fills the space between the granules. The fact that the inert particles fill that part of the space between the granules not occupied by the binder makes it possible to apply a heavy pressure to the body of the block or board in compacting the same. Without this mass of inert particles between the granules the cement binder would be squeezed into these spaces completely filling them and obliterating the granules from view.

Figure 3:
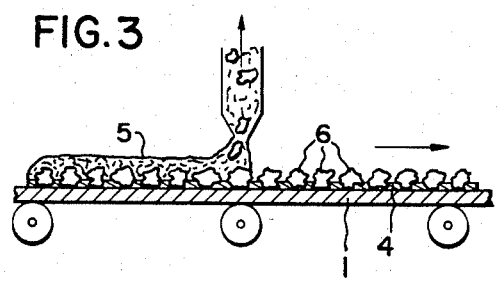
FIGURE 3 shows the removal of excess granules as by means of suction or vibration leaving only a single layer of granules 6 partly embedded in the layer of inert particles.

By careful adjustment of a syntron or other granule depositing means the granules can be evenly deposited in a single layer and the step of removing the excess granules shown in FIGURE 3 may be eliminated, but the size of the spaces between the granules is increased if the step shown in FIGURE 3 is eliminated. Spreading of the granules in excess and then removing the excess is therefore preferred. The excess may be removed in various ways as by means of suction, or by tilting the supporting caul, or a vibrating mechanism.

Figure 4:
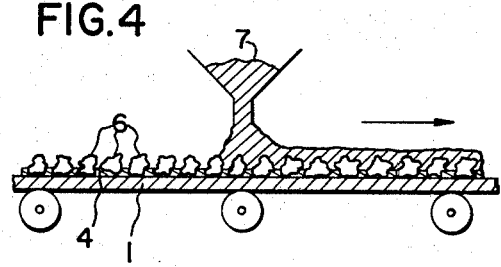
FIGURE 4 shows an inorganic binder 7 such as portland cement being spread on the layer of mineral granules.
Figure 5:
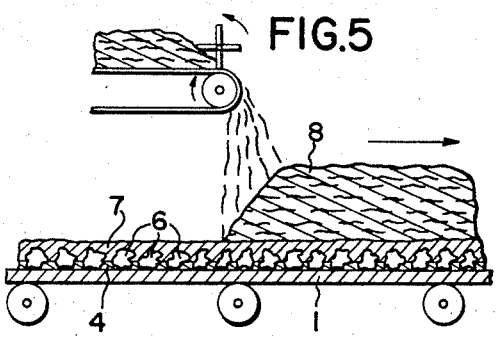
FIGURE 5 shows a mat 8 of binder-coated particles such as wood shavings, cinders or pumice being deposited on the cement 7.

The binder for holding the granules to the body of the block or board may be deposited as a slurry as shown in FIGURE 4, or by depositing the dry cement on the surface with a screen and then spraying water on the bed of cement until a slurry-like consistency is obtained. FIGURE 5 shows such a slurry 7 on the granules 6.

Figure 6:
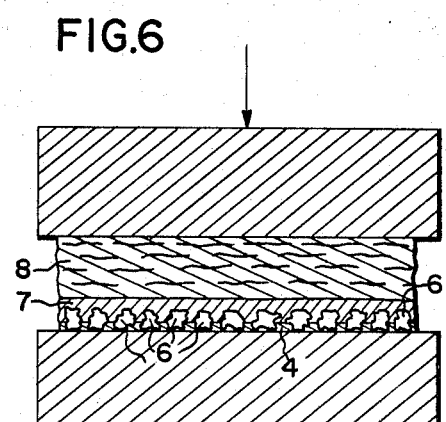
FIGURE 6 shows the mat 8 of binder-coated particles being compacted under pressure.
Figure 7:
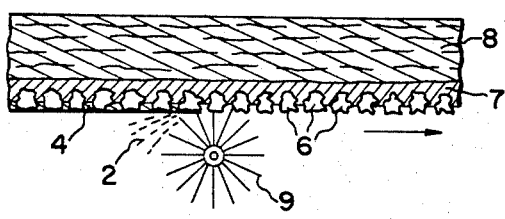
FIGURE 7 shows the removal of the inert particles not bonded to the cement, as by means of a rotating brush 9. Due to the method of manufacture the exposed portions of the granules lie substantially in a common plane.

FIGURE 5 shows a method of depositing binder-coated wood shavings known as air-felting. Other methods of depositing binder coated particles may be used. A freshly formed cinder block or pumice block in which the cement on the aggregate has not yet set may be placed on the cement 7. Light pressure beyond the weight of the block may be introduced provided it does not distort the freshly formed block. Heavy pressure as shown in FIGURE 6 is necessary when using strand-like wood shavings and maximum board strength is desired. By allowing the cement binder on the particles or aggregate and the cement in which the granules are embedded to set simultaneously a firm bond between the granules and the body of the block or board is assured. For balancing the board a layer of granules and cement may also be applied on the back of the mat at the end of the forming line.

If the granules are to be bonded to a block previously made a supplementary size on the block is recommended to obtain a good bond to the set cement. Such sizes are well known and their use does not constitute a part of this invention. Simultaneous setting of the cement on the particles or the aggregate and that holding the granules is preferred because the resultant bond is stronger and more reliable.

When heavy pressure is used in conjunction with wood shavings as in FIGURE 6 the pressure must be maintained until the cement has set. The mat will then no longer expand when the pressure is removed nor will it subsequently expand when it gets wet in the weather.

If the inert particles are removed promptly after the cement has set they can be easily brushed off. If allowed to dry and cake the addition of water may be advantageous. All the inert particles are removed except the thin layer that is bonded to the cement. In place of neat cement a mortar of fine sand or fine mineral granules may be used as the binding medium binding the granules to the body of the block or board.

The block or board emerging from the operation after removing the inert particles has the desired textured surface in which mineral granules are exposed to view over substantially the entire area.

Although the foregoing invention has been described in some detail by way of illustration and example for purposes of clarity and understanding, it is understood that certain modifications may be practiced within the spirit of the invention as limited only by the scope of the appended claims.

I claim:

1. In the surfacing of a building block whose aggregate components are held together with an inorganic binder with exposed mineral granules the steps of: spreading a slurry of inert particles on a supporting surface, disposing mineral granules larger than the inert particles in the slurry until the mineral granules contact such supporting surface without the slurry extending beyond the mid-plane of the granules, spreading an inorganic binder on the layer of granules, placing an aggregate of wood shavings coated with an inorganic cement on the binder layer, the thickness of the aggregate exceeding the thickness of the binder layer, compacting the assembled layers on the supporting surface under pressure and when the binder has set then removing the inert particles not bonded to the binder from the space between the granules.

2. In the surfacing of a building block whose components are held together with an inorganic binder with exposed mineral granules, the steps of: spreading a slurry of inert particles on a supporting surface, depositing stone chips having flat facets into the slurry until the chips contact said supporting surface so that the flat facets assume a position parallel to the surface without the slurry extending beyond the mid-plane of the chips, spreading an inorganic binder layer on the chips, placing an aggregate of wood shavings coated with an inorganic cement on the binder, the thickness of the aggregate exceeding the thickness of the binder layer, applying pressure to the assembled layers of the supporting surface, and when the binder has set removing the inert particles not bonded to the binder from the space between the chips.

References Cited
UNITED STATES PATENTS

| | | | |
|---|---|---|---|
| 1,082,231 | 12/1913 | Nale | 264—256 X |
| 1,809,504 | 6/1931 | Carvel | 264—256 X |
| 1,856,906 | 5/1932 | Carvel | 264—256 |

ROBERT F. WHITE, *Primary Examiner.*

J. H. SILBAUGH, *Assistant Examiner.*